J. S. GOYE.
Doll-Supporter.
No. 9,003. Reissued Dec. 23, 1879.
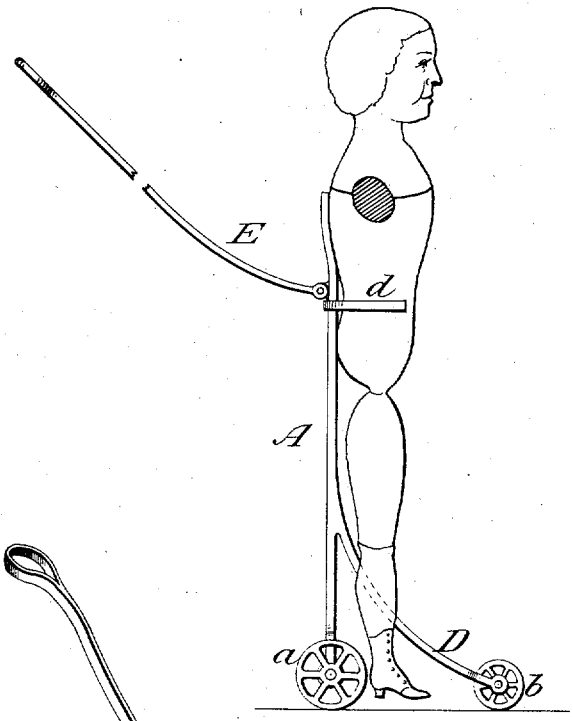
Fig. 1.
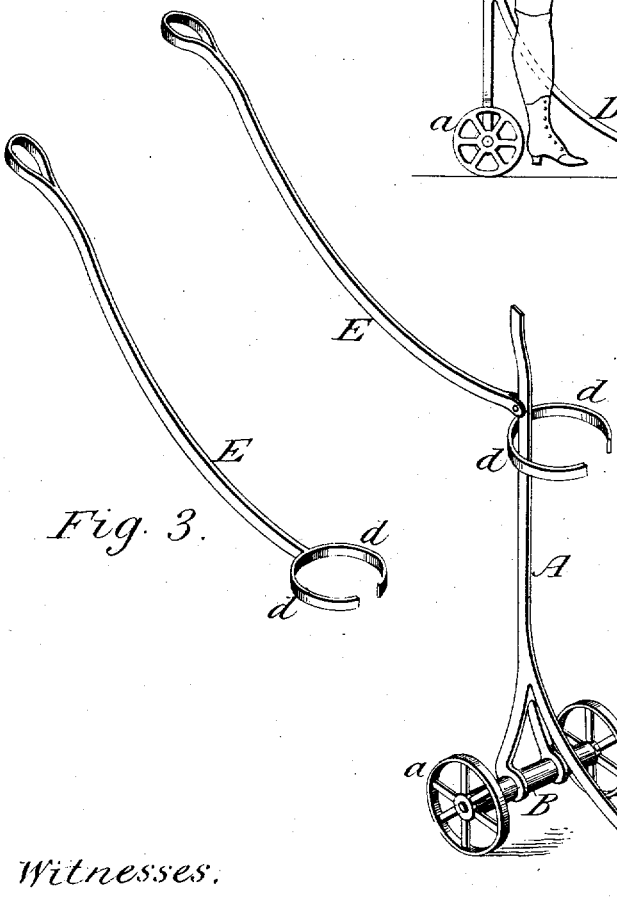
Fig. 3.
Fig. 2.
Witnesses.
Henry Howson Jr
Harry Smith
Inventor.
Josephine S. Goye
by her Attorneys
Howson & Sons
N. PETERS, PHOTO-LITHOGRAPHER, WASHINGTON, D. C.

UNITED STATES PATENT OFFICE.

JOSEPHINE S. GOYE, OF BOSTON, MASSACHUSETTS.

IMPROVEMENT IN DOLL-SUPPORTERS.

Specification forming part of Letters Patent No. 220,606, dated October 14, 1879; Reissue No. 9,003, dated December 23, 1879; application filed November 22, 1879.

*To all whom it may concern:*

Be it known that I, JOSEPHINE S. GOYE, of Boston, Suffolk county, Massachusetts, have invented a new and useful Improvement in Perambulators for Dolls, of which the following is a specification.

The object of my invention is to construct a simple and comparatively inexpensive perambulating device, which can be readily attached to or removed from an ordinary doll-body; and this object I attain in the manner which I will now proceed to describe, reference being had to the accompanying drawings, in which—

Figure 1 is a side view of a doll-body with the improved perambulating device attached thereto; Fig. 2, a perspective view of the perambulating device detached from the doll-body, and Fig. 3 a perspective view of a modification.

A is a vertical bar, forked at the lower end, and having bearings for a transverse axle, B, which carries at each end a wheel, *a*. From the bar A an arm, D, projects forward, and this arm has a forked end, forming bearings for the shaft of a wheel, *b*.

Near the upper end of the bar A is secured a split ring or band, *d*, forming a spring-clasp, which can be readily applied to or removed from the waist of the doll-body, the height of the bar A being such that when the doll-body is supported by the clasp *d* the feet will be slightly above the floor or sidewalk, and the doll will be mounted entirely upon the wheeled frame, so that it can be readily pushed about from place to place. The bar A extends above the clasp *d*, so as to stiffen the body of the doll and keep the same in an upright position.

To the bar A is secured, preferably by pivoting it thereto, one end of a rod, E, the opposite end of which is furnished with a suitable handle, which can be grasped by the child, the rod thus forming a convenient means for trundling the doll about from place to place.

When the child is playing indoors the pusher-rod D may be detached.

The above-described device can be cheaply manufactured, can be readily applied to or removed from the doll-body, and when in place will not interfere with the dressing or undressing of the doll.

Instead of pivoting the rod E to the bar A, said rod may be made separate therefrom, and may have a clasp adapted to the waist of the doll, as shown in Fig. 3.

I claim as my invention—

1. The combination of a doll-body with the rod A, having a clasp for attachment to the body, a shaft, B, with wheels *a a*, and a forwardly-projecting arm, D, carrying a wheel, *b*, all substantially as set forth.

2. The combination of the wheeled frame, constructed for attachment to the doll-body, substantially as described, with a detachable pusher-rod, E, as set forth.

In testimony whereof I have signed my name to this specification in the presence of two subscribing witnesses.

JOSEPHINE S. GOYE.

Witnesses:
WILLIAM PEIRCE,
R. N. PEIRCE.